(No Model.)
A. BRATSCHIE.
THILL COUPLING.
No. 353,478. Patented Nov. 30, 1886.
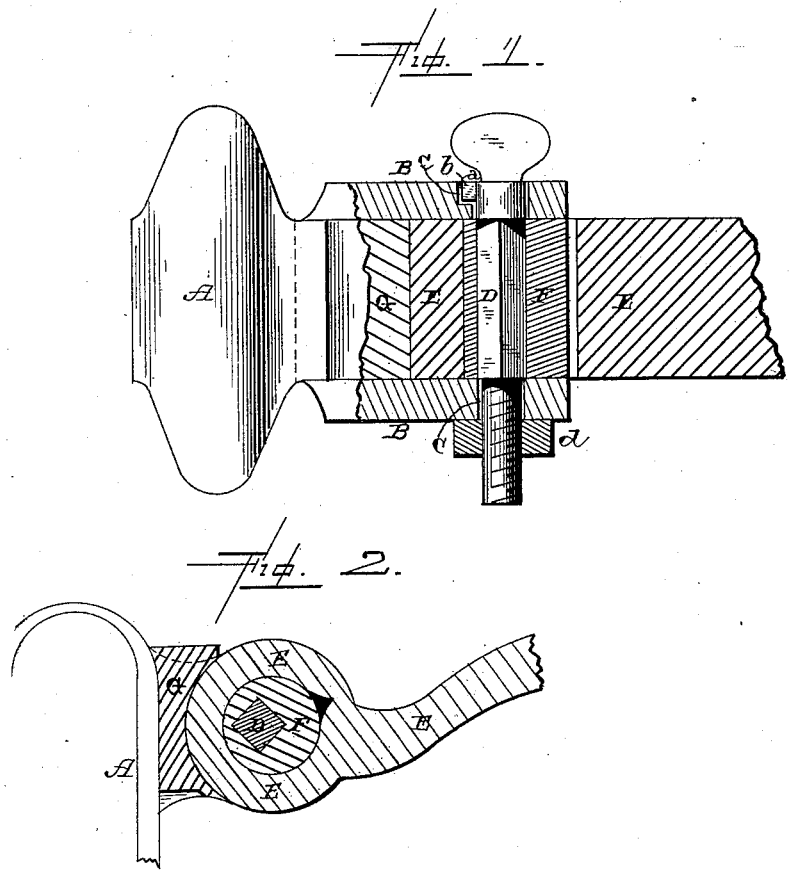
Witnesses
L. F. Gardner
A. W. Brecht
Inventor
A. Bratschie,
per F. A. Lehmann,
atty.

UNITED STATES PATENT OFFICE.

AMIEL BRATSCHIE, OF SHARPSBURG, PENNSYLVANIA.

THILL-COUPLING.

SPECIFICATION forming part of Letters Patent No. 353,478, dated November 30, 1886.

Application filed April 24, 1886. Serial No. 200,054. (No model.)

*To all whom it may concern:*

Be it known that I, AMIEL BRATSCHIE, a citizen of the United States, residing at Sharpsburg, in the county of Allegheny and State of Pennsylvania, have invented certain new and useful Improvements in Thill-Couplings, of which the following is a specification, reference being had therein to the accompanying drawings.

My invention relates to an improvement in thill-couplings; and it consists in placing between two projecting jaws of the clip the eye of the shaft-iron that incloses a bush with an eccentric axis, by means of which the bush can either be held in one position or turned in the eye to increase or diminish the distance between the eye and the clip for the compression or release of a rubber cushion, as will be fully described hereinafter.

My aim has been to invent a device by which the insertion or removal of the rubber cushion between the clip and the eye of the shaft-iron can be readily effected without tools invented for that purpose, which heretofore has been difficult to do, and I have also endeavored to combine in such a device the power of holding the cushion by continuous pressure to prevent a rattling noise of the coupling.

The accompanying drawings represent my invention.

Figure 1 is a horizontal section of a thill-coupling embodying my invention. Fig. 2 is a side elevation of the same.

A represents a clip for coupling the thills, and B the jaws projecting from the clip, each provided with a bolt-hole, C, of which one has a notch or recess, *a*. The bolt D has at one side, under its head, a projection, *b*, that enters the recess *a*, and prevents its turning when in place. The shank of the bolt D is square, and its end threaded for a nut, *d*, to keep it from sliding out of place. The eye E of the shaft-irons, placed between the jaws B of the clip A, contains a bush, F, of which the axis is made eccentric by a square hole at the side of the center, into which the shank of the bolt D enters, that, when turned, also turns the bush in the eye.

Between the eye E and the clip A is a rubber cushion, G, filling the space. In order to introduce or to remove the cushion, the nut *d* being loosened, it is necessary to partly withdraw the bolt D to release the projection *b* from the recess *a*, then to turn the bolt, and with it the bush F, so as to bring the shorter part of its diameter toward the clip, which removes the eye farther off and enlarges the space in which the cushion is held or from which it is to be removed. The rubber cushion being inserted into the enlarged space, the bolt and bush are returned to their former positions and the projection *b* replaced in the recess *a*. In this position the longer part of the diameter of the bush is turned toward the clip, pushing the eye in that direction to press against the cushion and firmly hold it in its place.

It will be readily understood from the foregoing that, by turning the bush with its eccentric axis, the unequally-divided diameter of the bush forces the eye of the shaft-iron back or forward, thereby enlarging or reducing space in which the cushion is held.

For the rubber cushion any other elastic material—such as steel springs—may be substituted. I also prefer to make the bush slightly longer than the width of the eye, so as to protrude at both sides, to be pressed against by the jaws of the clip.

Having thus described my invention, I claim—

1. The combination of the shaft-iron E, the clip A, provided with the jaws B, the bolt D, having a square portion, a revolving cam-shaped bush having an angular opening to receive the bolt, and the rubber G, substantially as shown.

2. The combination of the clip A, jaws B, one of which is provided with a recess, *a*, the bolt D, having an angular portion and provided with the projection *b*, the revolving bush F, through which the bolt passes, the thill-iron, and the cushion G, substantially as described.

In testimony whereof I affix my signature in presence of two witnesses.

AMIEL BRATSCHIE.

Witnesses:
  LOUIS MOESER,
  IG. STAUFFER.